Figure 1:
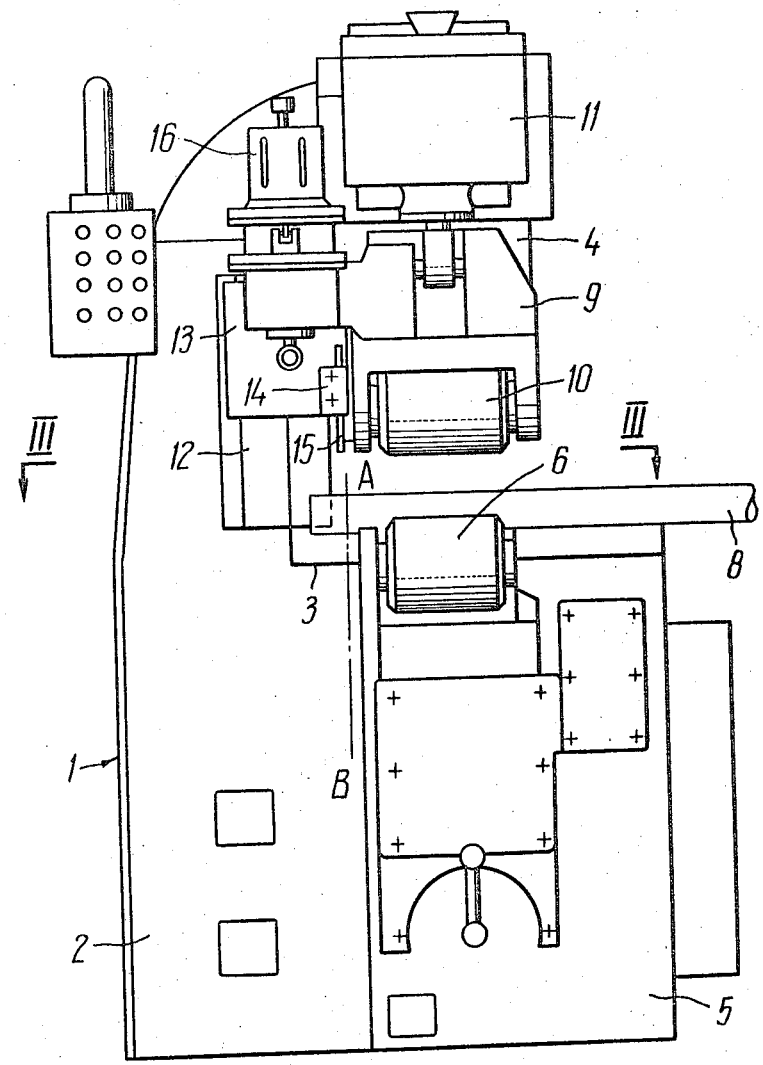

United States Patent [19]
Berdyansky et al.

[11] 3,807,260
[45] Apr. 30, 1974

[54] PIPE-CUTTING MACHINE

[76] Inventors: Mark Grigorievich Berdyansky, ulitsa Dzerzhinskogo, 24, kv. 17; Valter Alexandrovich Grinvald, ulitsa Novoorlovskaya, 14, kv. 8; Irman Idelevich Brodsky, ulitsa Komsomolskaya, 65, kv. 84; Vladimir Khrisanfovich Kasyan, ulitsa Naberezhnaya, 1, kv. 132; Nikolai Vasilievich Panjushkin, ulitsa Dzerzhinskogo, 18, kv. 43; Vladimir Fomich Veevnik, ulitsa Orlovskaya, 24A, kv. 21, all of Dnepropetrovsk, U.S.S.R.

[22] Filed: May 10, 1972

[21] Appl. No.: 252,013

[52] U.S. Cl. .................................................. 82/101
[51] Int. Cl. ............................................. B23b 3/04
[58] Field of Search ............ 82/46, 47, 4, 4 C, 70.1, 82/83, 86, 101, 102, 70.2

[56] References Cited
UNITED STATES PATENTS

| | | | |
|---|---|---|---|
| 3,173,318 | 3/1965 | Lindemann | 82/101 R X |
| 1,256,556 | 2/1918 | Hedges | 82/4 C |
| 3,107,564 | 10/1963 | Coker et al. | 82/101 R |
| 2,753,739 | 7/1956 | Dreier | 82/4 C |
| 1,468,935 | 9/1923 | Vosper | 82/101 R X |
| 1,721,298 | 7/1929 | Haase | 82/101 R X |
| 3,451,295 | 6/1969 | Shallenberg | 82/86 R |
| 3,222,962 | 12/1965 | Everett et al. | 82/83 R |
| 2,903,934 | 9/1959 | Montgolf et al. | 82/83 |
| 3,572,199 | 3/1971 | Harden | 82/101 |

Primary Examiner—Harrison L. Hinson
Attorney, Agent, or Firm—Waters, Roditi, Schwartz & Nissen

[57] ABSTRACT

A pipe-cutting machine comprising a bed in the form of a vertical pillar with horizontal parallel bosses. The lower boss is elongated and its elongated side surface has a projection for the installation of supporting rollers on which the pipe to be cut is laid. Arranged above the supporting rollers is a hold-down roller installed on the upper boss. One of the supporting rollers is power-operated for rotating the pipe while it is being pressed by the hold-down roller against the supporting rollers.

1 Claim, 3 Drawing Figures

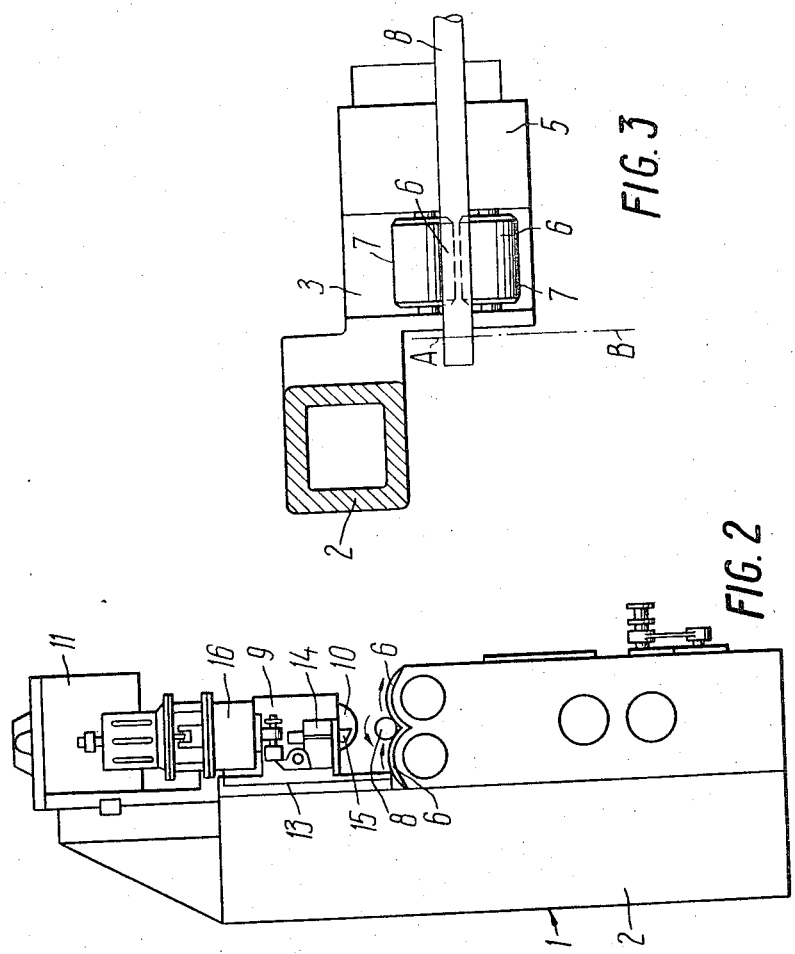

PIPE-CUTTING MACHINE

The present invention relates to equipment for finishing pipes and more particularly it relates to pipe-cutting machines.

The invention can be used to the greatest advantage for cutting cold-worked pipes with a diameter of 20 to 89 mm and a wall thickness of 2 to 8 mm though it can be employed equally well for cutting pipes of other dimensions.

Known in the art is a pipe-cutting machine consisting of a box-shaped bed, two horizontal supporting rollers one of which is power-operated for rotating the pipe a swinging arm with a hold-down roller installed parallel to the supporting rollers, and a swinging cutting tool in the form of a thin cutting disc mounted in the lower part of the bed (see, for example, U.S. Pat. No. 3,107,564, Cl. 82-101, USA).

The disadvantages of the known design include a considerable amount of time required for performing many conveying operations directly on the line of the machine.

Thus, before cutting off the end of the pipe, the latter must be fed axially by a conveying device into the machine, thrust against the stop limiting the length of the pipe end to be cut, and clamped between the rollers before cutting.

After cutting, the pipe is discharged from the machine again in the axial direction so that the machine is ready for cutting a new pipe only after it has discharged the old one.

It is more practicable that the pipe should be prepared for cutting on an auxiliary position before the machine and moved axially on this position. Then the pipes will be laid on the supporting rollers of the machine over the shortest possible route in the lateral (frontal) direction. This purpose can be served by the pipe-transfer mechanisms which are capable of discharging the cut pipe from the supporting rollers and laying on them a new pipe to be cut within a single cycle. Here lies a considerable reserve for stepping up the efficiency of the machine. A particularly tangible effect can be reached in cutting the pipes not larger than 89 mm in diameter and a wall thickness not over 8 mm in which case the auxiliary time runs as high as 60–70% of the cutting cycle.

However, the known design of the machine denies the possibility of introducing these improvements since lateral movement of the pipes is prevented by the swinging arm with the hold-down roller installed on the bed.

An object of the present invention is to provide a pipe-cutting machine in which the auxiliary time would be reduced to a minimum by providing a position for preparing a pipe for cutting and its lateral feeding into and out of the machine.

Another object of the invention is to provide a high-efficiency pipe-cutting machine.

These and other objects are achieved by providing a pipe-cutting machine comprising horizonal supporting rollers for the pipe, installed parallel to each other on a bed, one of said rollers being power-operated for rotating the pipe when the latter is pressed against said supporting rollers by a hold-down roller also installed on the bed with a provision for moving in a vertical plane, and a cutting tool for cutting the rotating pipe wherein, according to the invention, the machine bed is made in the form of a vertical pillar with two horizontal parallel bosses, the lower one being elongated and provided on its elongated side surface with a projection for mounting the supporting rollers in such a manner as to arrange their generating lines parallel to the elongated side of the projection whereas the upper boss carries a holddown roller located above the supporting rollers, the cutting tool being mounted on the vertical pillar after said projection.

Owing to the modification of the bed design, namely, providing it with a projection for the installation of the supporting rollers it becomes possible to place the prepared pipe on said rollers in a lateral direction regardless of the length of the pipe end to be cut and, in view of the fact that the bed is of the straight-through type in the form of a vertical pillar with two horizontal parallel bosses, the cutting plane is located in the gap between the bosses and the vertical pillar so that the cut pipe can be freely moved in a lateral direction for being discharged into a receiver or to the next processing position.

Now the invention will be described in detail by way of example with reference to the accompany drawings in which:

FIG. 1 is a side view of the pipe-cutting machine according to the invention;

FIG. 2 — same, rear view;

FIG. 3 is a section taken along line III—III in FIG. 1.

The pipe-cutting machine according to the invention comprises a bed 1 (FIGS. 1, 2) in the form of a vertical pillar 2 with two horizontal parallel bosses 3 and 4. The lower boss 3 is elongated and its elongated side surface has a projection 5 for the installation of supporting rollers 6. The generating lines 7 of the supporting rollers 6 are set parallel to the elongated side of the projection 5 as shown in FIG. 3.

The displacement of the projection 5 with relation to the vertical pillar 2 allows the pipe 8 to be laid on the supporting rollers 6 in a lateral direction.

Dovetailed into the upper box 4 is a slide 9 with a hold-down roller 10. The slide 9 can be moved in a vertical plane by an air cylinder 11 secured on the same boss 4.

The vertical pillar 2 is provided with dovetail guides 12 supporting a carriage 13 with a tool holder 14 and a cutting tool 15. The cut-off tool is powered by a pneudraulic drive 16.

The cutting tool 15 is installed in such a manner that the cutting plane of the pipe 9 (shown by line AB in the drawing) passes behind the projection 5 and in the plane of the gap of the bed 1, i.e. in the space between the horizontal bosses 3, 4 and the vertical pillar 2.

The supporting rollers 6 are rotated by an electromechanical drive located in the lower horizontal boss 3.

The pipe-cutting machine operates as follows.

The pipe 8 prepared for cutting is laid in a lateral direction on the rotating supporting rollers 6. Then the hold-down roller 10 together with the slide 9 are lowered by the air cylinder 11 on the pipe 8, pressing it against the supporting rollers 6.

Then the pneudraulic drive 16 of the cutting tool is turned on, the carriage 13 starts moving and the cut-off tool 15 starts cutting the pipe.

After the pipe has been cut off, the air cylinder 11 returns the slide 9 with the hold-down roller 10 to the initial position; simultaneously the cut-off tool 15 with the carriage 13 also returns to the initial position and the cut pipe 8 is discharged from the rollers in a lateral direction and its place is taken by a new pipe. Then the above-described operations are repeated over again.

We claim:

1. A pipe-cutting machine, comprising a bed with a vertical pillar having two horizontal parallel bosses, the lower of which is elongated; a projection provided on the elongated side of said lower boss and offset with respect to the vertical pillar; supporting rollers mounted in parallel on said projection of the lower boss so that their generating lines are parallel to the elongated side of said projection, said supporting rollers corresponding to pipes fed in a frontal direction and to be placed on said supporting rollers, the offset of said projection with respect to said vertical pillar allowing for pipe movement in a frontal direction prior to cutting and for unrestricted pipe movement in said frontal direction after cutting; a hold-down roller mounted on the upper of said bosses above said supporting rollers and movable in a vertical plane to press the pipe against said supporting rollers; means mounted on said upper boss for moving said hold-down roller, one of said supporting rollers being a drive roller for imparting rotary motion to the pipe as the latter is pressed against said supporting rollers by means of said hold-down roller; means for rotating said drive roller; a cutting tool mounted on said vertical pillar and between said pillar and said projection for withdrawing the cut-off pipe to an unlimited distance frontally in the space defined by said bosses; and means mounted on said upper boss for imparting working feed motion to said tool.

* * * * *